No. 802,439. PATENTED OCT. 24, 1905.
S. WILBURN.
STALK CUTTER.
APPLICATION FILED JUNE 15, 1905.
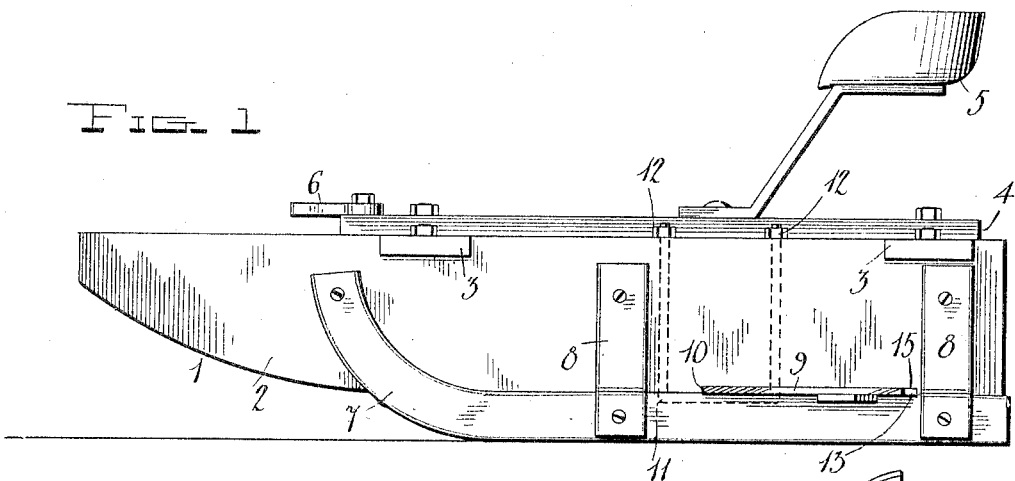
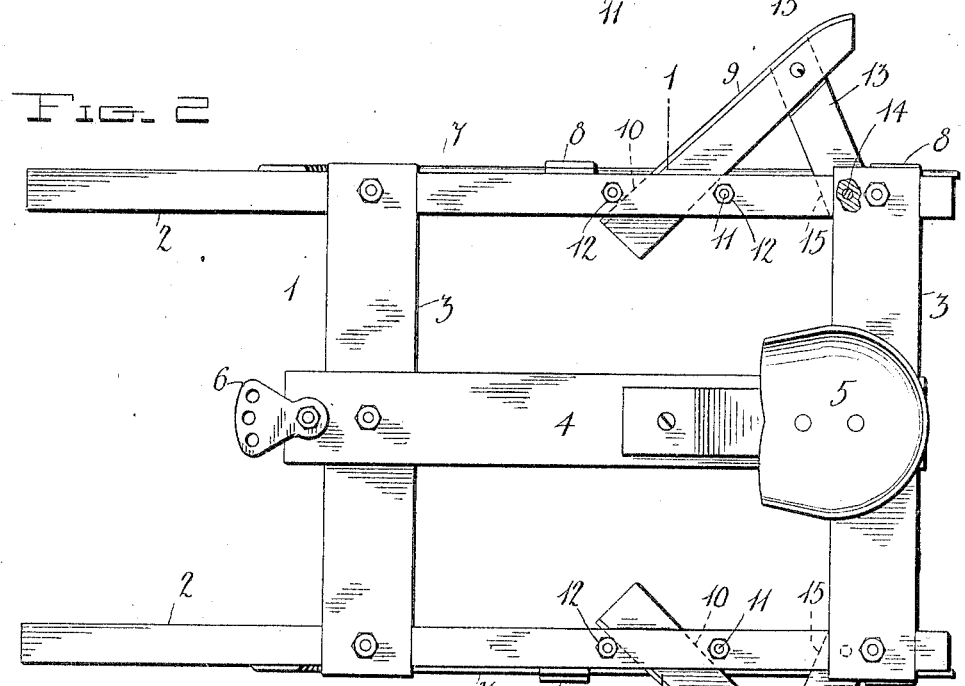
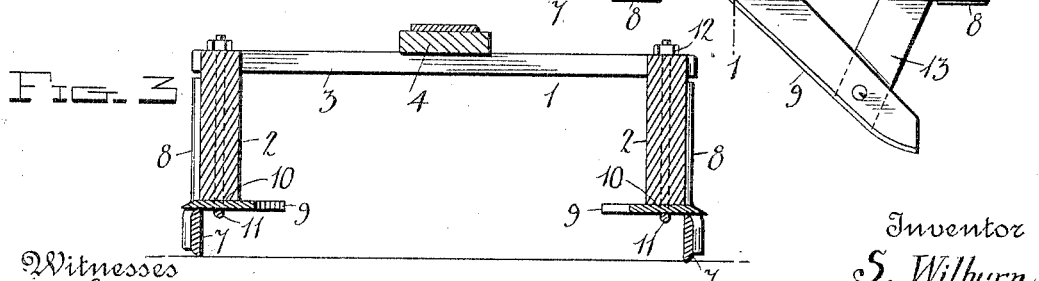
Witnesses
Inventor
S. Wilburn
by H. B. Willson
Attorney

UNITED STATES PATENT OFFICE.

SYLVESTOR WILBURN, OF MYERS, TEXAS.

STALK-CUTTER.

No. 802,439. Specification of Letters Patent. Patented Oct. 24, 1905.

Application filed June 15, 1905. Serial No. 265,465.

*To all whom it may concern:*

Be it known that I, SYLVESTOR WILBURN, a citizen of the United States, residing at Myers, in the county of Burleson and State of Texas, have invented certain new and useful Improvements in Stalk-Cutters; and I do declare the following to be a full, clear, and exact description of the invention, such as will enable others skilled in the art to which it appertains to make and use the same.

This invention relates to stalk-cutters; and one of the principal objects of the same is to provide a simple, durable, and efficient device for cutting stalks, like cotton, cornstalks, or weeds, while standing.

Another object is to provide means for adjusting and holding the knives or cutters in adjusted position on the frame of the machine.

These and other objects are attained by means of the construction illustrated in the accompanying drawings, in which—

Figure 1 is a side view of a stalk-cutter made in accordance with my invention. Fig. 2 is plan view of the same, and Fig. 3 is a transverse sectional view on the line 1 1 of Fig. 2.

Referring to the drawings for a more particular description of my invention, the numeral 1 designates the frame of the implement, consisting of runners 2 2, connected by cross-bars 3 3, and a longitudinal bar 4, secured to the cross-bars and supporting a seat 5. A suitable clevis 6 is secured to the longitudinal bar 4. Secured to each of the runners is a curved bar 7. Braces 8 extend upward from the bars 7 and are secured at the side of the runners. The knives or cutters 9 are secured in recesses 10, formed in the bottom edges of the runners, and these cutters are held in place by means of the U-shaped bars 11, which pass through the runners, and are provided with suitable nuts 12, turned upon their upper ends. Braces 13 are pivotally secured to the cutters at one end and at opposite ends are secured by bolts 14 in recesses 15 at the rear ends of the runners.

The operation of my invention may be described as follows: The stalk-cutter is drawn along between two rows of cotton-stalks, cornstalks, or other stalks to be cut. The knives projecting laterally and inclining rearwardly to the line of draft are adapted to cut stalks efficiently.

To adjust the knives 9, the bolts 14 and U-shaped bars 11 are loosened and the braces 13 and the knives are pushed inwardly to the required angle, when the nuts on said bolts 14 and bars 11 are tightened up to hold the parts in place.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. An implement for cutting stalks, comprising side runners, curved bars secured to said runners, knives or cutters fitted in the bottom of the runners, U-shaped keepers for securing said knives in place, and a brace secured to each knife and extending backward and secured to the runners, substantially as described.

2. A stalk-cutter comprising a frame runners, curved bars secured to the runners, knives or cutters secured to the runners between said bars and runners by means of U-shaped keepers, braces extending rearwardly from the knives to the runners, and a driver's seat on the runner-frame, substantially as described.

3. A stalk-cutter comprising runners, a curved bar secured to each of said runners, knives secured between the runners and curved bars, U-shaped keepers for holding the knives in place, adjustable brace-bars pivoted to the knives at one end and having their opposite ends connected to the runners for adjusting the angle of the knives, substantially as described.

In testimony whereof I have hereunto set my hand in presence of two subscribing witnesses.

SYLVESTOR WILBURN.

Witnesses:
A. L. EWING,
G. G. FOSTER.